United States Patent [19]

Rogers, Jr.

[11] Patent Number: 4,984,393
[45] Date of Patent: Jan. 15, 1991

[54] METHOD FOR TIRE UNIFORMITY CORRECTION

[75] Inventor: Clarence L. Rogers, Jr., Hartville, Ohio

[73] Assignee: The Uniroyal Goodrich Tire Company, Akron, Ohio

[21] Appl. No.: 481,795

[22] Filed: Feb. 15, 1990

Related U.S. Application Data

[60] Continuation of Ser. No. 322,870, Mar. 14, 1989, abandoned, which is a division of Ser. No. 68,687, Jul. 1, 1987, Pat. No. 4,837,980.

[51] Int. Cl.$^5$ .............................................. B24B 49/00
[52] U.S. Cl. ................................ 51/165 R; 51/165.92; 51/DIG. 33; 51/281 R
[58] Field of Search ........ 51/165 R, 165.92, DIG. 33, 51/281 R, 106 R; 73/146, 146.2

[56] References Cited

U.S. PATENT DOCUMENTS

| 3,574,973 | 4/1971 | Rader .................................. 51/106 R |
| 3,724,137 | 4/1973 | Hofelt, Jr. et al. ........ 51/DIG. 33 X |
| 3,739,533 | 6/1973 | Iida et al. .................. 51/DIG. 33 X |
| 3,817,003 | 6/1974 | Moreajjem ............... 51/DIG. 33 X |
| 3,914,907 | 10/1975 | Hofelt, Jr. et al. ........ 51/DIG. 33 X |
| 4,018,087 | 4/1977 | Wenz ...................................... 73/146 |
| 4,095,374 | 6/1978 | Ugo ................................... 51/165 R |
| 4,173,850 | 11/1979 | Gormish et al. ................... 51/281 R |
| 4,327,580 | 5/1982 | Suzuki et al. .......................... 73/146 |
| 4,404,849 | 9/1983 | Iwama et al. .......................... 73/146 |

FOREIGN PATENT DOCUMENTS 0110933 7/1982 Japan ..................................... 73/146

OTHER PUBLICATIONS

High Speed Uniformity Machines and Nature of Tire Force Variations, Society of Automotive Engineers Inc., No. 720464, National Automobile Engineering meeting May 22–26, 1972, Hofelt et al.

Primary Examiner—Frederick R. Schmidt
Assistant Examiner—M. Rachuba
Attorney, Agent, or Firm—Michael J. Colitz, Jr.; Alan A. Csontos

[57] ABSTRACT

A method and apparatus for tire uniformity correction. During a sensing phase, the tire to be corrected is rotated at a speed higher than the industry standard of 60 revolutions per minute while sensing the force variations to be removed. During a rubber removal phase, the tire is rotated at a slower speed tire while removing rubber in selected amounts from slected areas of the tire corresponding force variations. Frequency modified electrical signals are generated in response to the sensed force variations in the tire during the sensing phase, such signals being at frequencies higher than the industry standard of 60 cycles per minute. Such frequency modified signals are then filtered in summer amplifiers, processed and stored in a microprocessor and then utilized for the removal of rubber in a programmed manner.

26 Claims, 2 Drawing Sheets

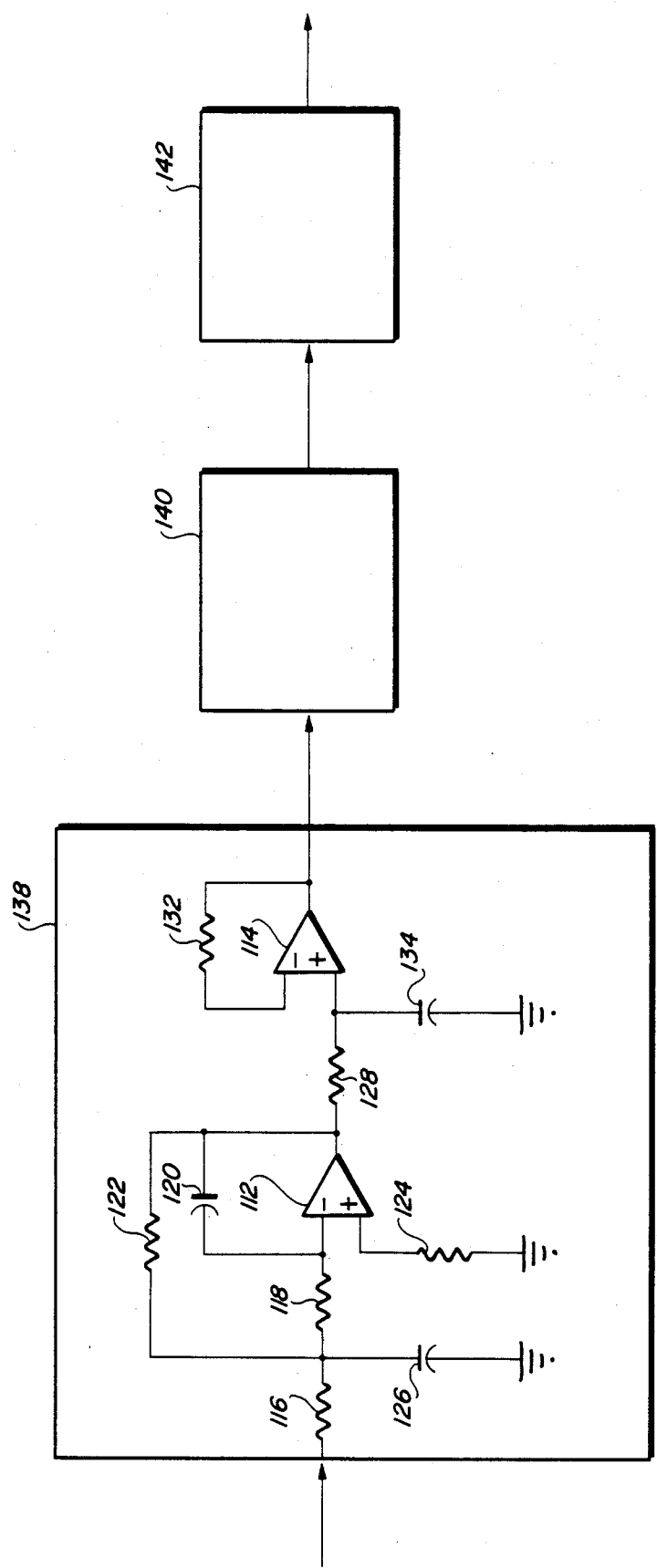

METHOD FOR TIRE UNIFORMITY CORRECTION

This is a continuation of copending application Ser. No. 07/322,870 filed on Mar. 14, 1989 now abandoned, which now is a Divisional Application of Ser. No. 07/068,687 filed July 1, 1987 now U.S. Pat. No. 4,837,980.

BAKCGROUND OF THE INVENTION

1. Field of the Invention

This invention relates to the processing of tires for uniformity correction and, more particularly, to a method and apparatus for testing tires for force variations more rapidly than previously possible and for grinding the tested tires to eliminate such force variations.

2. Description of the Prior Art

In the art of manufacturing pneumatic tires, various components such as belts, beads, liners, treads, plies of rubberized cords, and the like are segmentally assembled. During the assembling, structural nonuniformities may occur. When nonuniformities are of sufficient magnitude, they will cause force variations on a surface, such as a road, against which the tires roll and thereby produce vibrational and accoustical disturbances in the vehicle upon which the tires are mounted.

Force variations in rotating tires may ocur in either the radial or lateral direction. Force variations are anomalies which result from "hard" and/or "soft" spots in the tires caused by structural nonuniformities such as inconsistent wall thickness, ply turn-up variations, bead set, ply arrangement and other deviations. Regardless of the cause of the force variations, when such variations exceed the acceptable minimum level, the ride of a vehicle utilizing such tires will be adversely affected.

Excessive force variations may be eliminated or reduced to an acceptable level by processing on a tire uniformity machine. Typical examples of known tire uniformity machines are described, for example, in U.S. Pat. Nos. 3,574,973 to Rader; 3,725,163 to Hofert; and 4,458,451 to Rogers et al. Where the force variations are detected, correction is effected by removing selected portions of tread rubber with a pair of grinders, one located in association with each shoulder of the tire. Removal of rubber in a proper amount and at the proper locations effects a reduction in force variations to an acceptable level for improving the ride of the vehicle upon which such tires are mounted.

In typical tire uniformity machines, a tire is mounted on a rotatable axle, inflated and then rotated against a loadwheel for a testing phase. During its initial revolutions, the tire is loaded at a first predetermined load. Thereafter, the tire is rotated under full load for additional rovolutions. These revolutions, generally referred to as "warmup" time, are performed to relieve any "set" in the tire that may have occurred during storage. Detection for excessive force variations is started after the warmup is completed.

Force variations are transmitted from the tire to the loadwheel where such force variations are sensed by transducers, such as load cells, Electrical signals representing the magnitude of the measured force variations are generated and sent to a microprocessor. The measurement of force variations is generally performed during one to three revolutions of the tire depending on the design of the electrical circuitry employed. The signals are processed and compared to predetermined upper and lower limits of correctable force variations. In response to the signals, the computer makes a grind or no-grind decision by comparing the actual measured force variations to the upper and lower limits. If the measured force variations do not exceed the lower limit, no grinding is performed, the tire is graded as acceptable, and it is removed from the machine. If the measured force variations exceed the upper limit, the force variations are considered noncorrectable, no grinding is performed and the tire is also removed from the machine.

If the measured force variations are between the upper and lower limits, grind instruction signals are generated and the grinding phase is initiated. Mechanisms are actuated by the grind instruction signals to move rotary grinders to the shoulders of the tire. The grinders remove selected quantities of rubber from selected areas of the shoulders for reducing the force variations to an acceptable level at or below the lower limit. The time required to reduce the force variations in a tire to an acceptable level is dependent upon the amount of rubber to be removed and the rotational speed of the tire during processing.

The uniformity machines may be rendered more efficient by several techniques. First, the radial component of the force variations may be detected more efficiently or more accurately. U.S. Pat Nos. 3,754,358 to Schively et al and 4,458,451 to Rogers, for example, are related to tire uniformity machines with improvements for radial correction. Second, the lateral component of the force variations may be detected more efficiently or more accurately. U.S. Pat Nos. 4,095,374 to Ugo and 4,112,630 to Brown, for examples, are related to tire uniformity machines with improvements for lateral correction. Third, the rotational speed of the tire on the uniformity machine may be increased. While grinding may be done at one of a plurality of slower speeds, speeds below the testing speed, testing is typically done at a constant speed of 60 revolutions per minute (rpm), the industry standard. Note U.S. Pat. Nos. 3,500,681 to Shively and 3,574,973 to Rader. It might be considered that increasing the rotational speed of a tire on a uniformity machine might be accomplished simply as by an increase in a mechanical gearing ratio or the like. Such is not the case since the mechanically increased speed must be compatible with the circuitry and mechanisms for both sensing and grinding. No prior art patent or known commercial device teaches or suggests the operating of tire uniformity machines at increased speeds while retaining high accuracy and efficiency.

As illustrated by the great number of prior patents and commercial devices, efforts are continuously being made in an attempt to more efficiently correct tire nonuniformity. None of these prior art efforts, however, suggests the present inventive combination of method steps and component elements arranged and configured for correcting tire uniformity at increased speeds and maintained accuracy as disclosed and claimed herein. Prior methods and apparatus do not provide the benefits of the present invention which achieves its intended purposes, objectives and advantages over the prior art devices through a new, useful and unobvious combination of method steps and component elements, through no increase in the number of functioning parts, at a reduction in operational cost, and through the utilization of only readily available materials and conventional components.

These objects and advantages should be construed as merely illustrative of some of the more prominent features and applications of the present invention. Many other beneficial results can be attained by applying the disclosed invention in a different manner or by modifying the invention within the scope of the disclosure. Accordingly, other objects and advantages as well as a fuller understanding of the invention may be had by referring to the summary and detailed description of the preferred embodiment of the invention in addition to the scope of the invention as defined by the claims taken in conjunction with the accompanying drawings.

SUMMARY OF THE INVENTION

The present invention is defined by the appended claims with the specific preferred embodiment shown in the attached drawings. For the purposes of summarizing the invention, the invention may be incorporated into an improved tire uniformity machine for processing a rubber pneumatic tire by sensing its force variations while it is rotating and by then grinding rubber therefrom in selected amounts and regions corresponding to the sensed force variations. The tire uniformity machine comprises a mechanical means to rotate a pneumatic tire at a speed higher than the industry standard of 60 revolutions per minute and to selectively grind rubber therefrom. The machine also comprises a sensor means to detect force variations in the tire while rotating at such higher speed and in response thereto, to produce frequency modified electrical signals corresponding to the detected force variations at a frequency higher than the industry standard of 60 cycles per minute. The machine also comprises a rubber removal means responsive to the produced signals for selectively removing rubber from the rotating tire in accordance with the detected force variations. The machine also comprises a summer amplifier to receive and filter the produced signals from the sensor means and forward such filtered signals. The machine also comprises a microprocessor to receive the forwarded filtered signals, from the summer amplifier, to interpret such filtered signals, to store such interpreted signals, and then to activate the mechanical means and rubber removal means in a programmed manner in accordance with such stored signals.

The summer amplifier includes an active filter and a buffer filter with resistors and capacitors in a filter network. The tire uniformity machine further includes a zero suppression network following the filter network whereby its output varies about a zero voltage reference potential. The tire uniformity machine further includes a second buffer amplifier for gain adjustment following the zero suppression network. The machine further includes improved electronics for rotating a tire at a predeterminer number of revolutions per minute above 60 with higher frequency signals generated at an equal predetermined number of cycles per minute. The machine further includes rotating a tire at about a predetermined 100 revolutions per minute. The sensing means includes two pairs of load cells, one pair of load cells to detect the radial force variations and the other pair of load cells to detect the lateral force variations. The machine further includes a second summer amplifier, one summer amplifier for receiving signals from one pair of load cells and the other summer amplifier for receiving signals from the other pair of load cells.

The invention may further be incorporated into improved electronic means to filter, interpret and store frequency modified electrical signals generated while the tire is rotated at a higher speed in excess of the industry standard of 60 revolutions per minute. The improved electronic means is for incorporaion in a tire uniformity machine having mechanical means to rotate a pneumatic tire and sensor means to detect force variations in the tire while it is rotating and to generate frequency modified electrical signals in response thereto corresponding to the detected force variations. The improved electronic means includes a summer amplifier to filter the generated electrical signals and a microprocessor to interpret and store the filtered frequency modified electrical signals. The summer amplifier includes component elements to receive the unfiltered signals from the sensor means at frequencies higher than the industry standard of 60 cycles per minute, to filter the received frequency modified signals at a frequency correlated to the higher speed of rotation of the tire, and to forward such filtered signals to the microprocessor for being interpreted, stored and utilized.

The improved electronic means further includes a second summer amplifier. The first summer amplifier is adapted to receive signals generated in response to radial force variations and the second summer amplifier is adapted to receive signals generated in response to lateral force variations. Each summer amplifier includes a filtering network having amplifiers, resistors and capacitors with the capacitance of the capacitors reduced in value by a factor inversely related to the factor by which the speed of rotation of the tire is increased above the industry standard. The microprocessor includes means responsive to the output of the second summer amplifier to determine the conicity of the tire. A zero suppression network is included following the filtering network whereby the output therefrom varies about a zero voltage reference potential. The invention further includes a gain adjusting buffer amplifier network following the zero suppression network.

In addition, the invention may further be incorporated into a method of processing a tire by sensing force variations in the tire while it is rotating and by then removing material therefrom in selected amounts and regions corresponding to the sensed force variations. The method comprises the step of rotating a pneumatic tire to be processed at a predetermined speed in excess of the industry standard of 60 revolutions per minute. The method further comprises the step of sensing force variations in the rotating tire and, in response thereto, producing frequency modified electrical signals corresponding to the sensed force variations at a frequency higher than the industry standard of 60 cycles per minute. The method further includes the step of removing material from the rotating tire in a programmed manner responsive to the produced electrical signals. The method further includes the step of processing the produced electrical signals in a summer amplifier by receiving the produced signals, by filtering such produced signals at a frequency higher than the industry standard frequency and correlated to the speed of rotation of the tire, and by forwarding such filtered higher frequency signals. The method also includes the step of further processing the filtered higher frequency signals in a microprocessor by receiving the forwarded higher frequency filtered signals from the summer amplifier, by interpreting such received high frequency filtered signals and by storing the interpreted higher frequency filtered signals. The method further includes the step of utilizing such stored signals to program the rotating of the tire and the removing of rubber from the rotating tire.

The method also includes the sensing of both the radial and lateral force variations in the tire. The method also includes processing and further processing done in one microprocessor and two summer amplifiers, one summer amplifier for signal generated in response to radial force variations and one summer amplifier for signals generated in response to lateral force variations. Each summer amplifier includes serially aligned amplifiers and associated resistors and capacitors arranged to constitute a filtering network. The method further includes the steps of suppressing the voltage from the filtering network about a zero voltage reference potential and then adjusting the gain through a buffer amplifier. The method further includes the step of interpreting the output of the second summer amplifier in the micorprocssor to determine the conicity of the tire. The method results in measurements which correlate closely with those obtained at 60 revolutions per minute even though the measurements were taken at a higher number of revolutions per minute. The higher number of revolutions per minute is 100 revolutions per minute.

The foregoing has outlined rather broadly the more pertinent and important features of the present invention in order that the detailed description of the invention that follows may be better understood whereby the present contribution to the art may be more fully appreciated. Additional features of the invention will be described hereinafter which form the subject of the claims of the present invention. It should be appreciated by those skilled in the art that the conception and the specific embodiment disclosed herein may be readily utilized as a basis for modifying or designing other methods and apparatus for carrying out the same purposes of the present invention. It should also be realized by those skilled in the art that such equivalent methods and apparatus do not depart from the spirit and scope of the invention as set for the in the appended claims.

BRIEF DESCRIPTION OF THE DRAWINGS

For a more complete understanding of the nature, objects and advantages of the present invention, reference should be had to the following detailed description taken in conjunction with the accompanying drawings in which:

FIG. 2 is a detailed electrical diagram illustrating one of the summer amplifiers shown in FIG. 1.

DETAILED DESCRIPTION OF THE INVENTION

Figure 1:
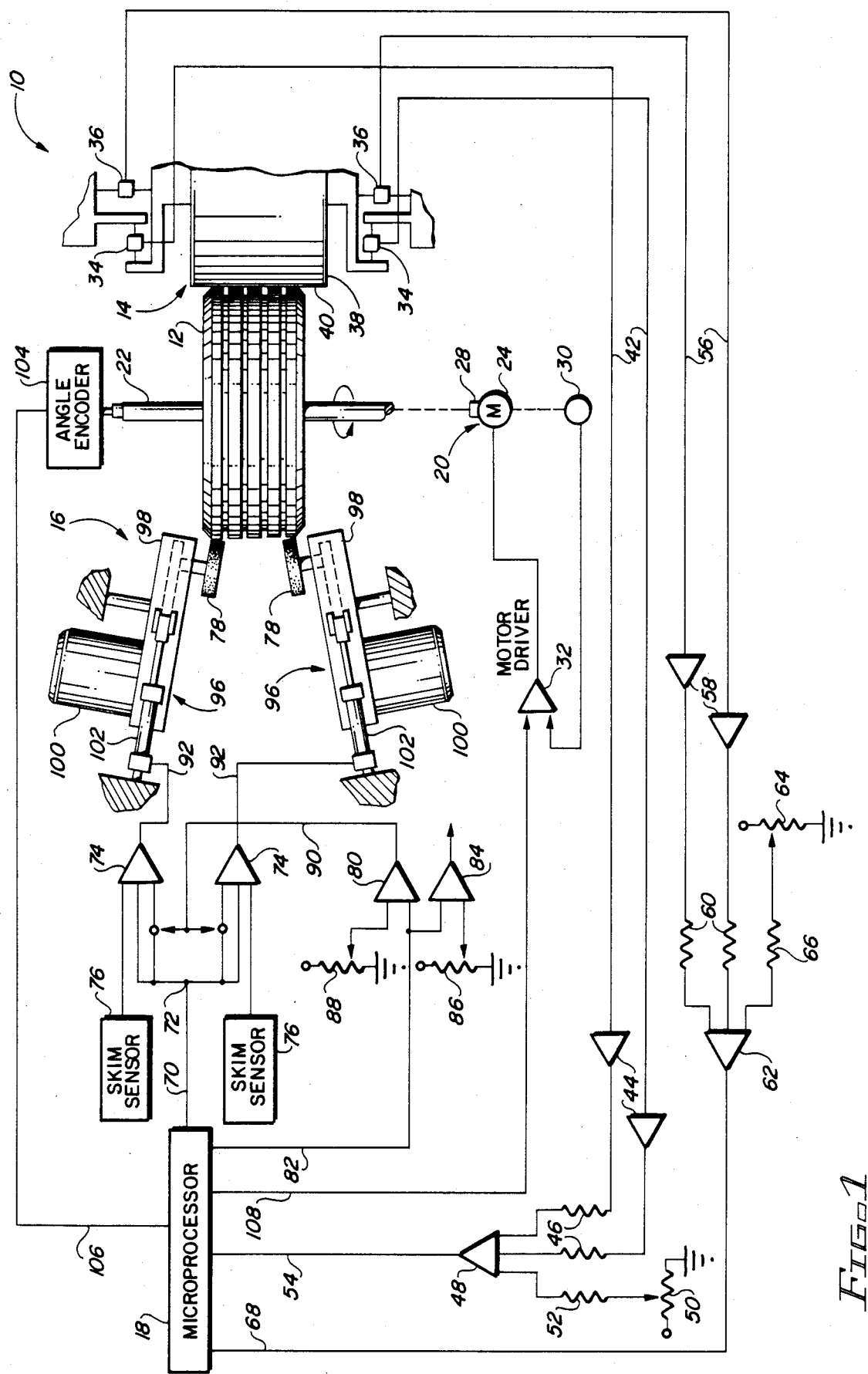
FIG. 1 is a schematic illustration of a tire uniformity machine for detecting, measuring and reducing force variations in a pneumatic tire.

In FIG. 1 there is shown by schematic representation a tire uniformity machine 10 which operates to reduce radial and lateral force variations in a pneumatic tire 12 in a faster and more efficient manner than was previously possible. The tire uniformity machine 10 includes a detection assembly 14 to sense and measure force variations in a tire, a rubber removal assembly 16 to remove rubber from the tire 12, a microprocessor 18 to process signals received from the detection assembly and a motor 20 for rotating the pneumatic tire at various speeds.

The motor 20 includes a rim upon which the tire is mounted. The rim is carried on a spindle 22 turned by a variable speed rotary drive means 24. The drive means 24 is capable of rotating the tire at various speeds as between about 1 and about 200 rpm. The speed during the grinding phase of the operation is detemined by the type of tire being processed but seldon exceeds 15 rpm. The speed during the sensing phase of the operation has heretofore been a standard 60 rpm but, in accordance with the present invention is significantly higher, 100 rpm in accordance with the preferred embodiment as disclosed herein for accellerating the tire uniformity correction process. The drive means 24 has the capacity to rapidly change from the grind speed to the nongrind speed and from the nongrind speed to the grind speed in less than one second and more preferably in less than about $\frac{1}{4}$ second.

The grind speed and nongrind speed can be achieved by a drive means such as an AC motor with suitably gearing and clutching or can be achieved with a DC motor. It has been found, however, that a low inertia DC motor and a 10:1 gear reducer 28 can achieve the various rotating speeds as well as the speed changes. Such a low inertia DC motor has a rating of about 5 horsepower and includes a motor shaft to which is attached a tachometer 30 for providing feedback to a motor drive 32 for controlling the motor speed. The precise speed control of the low inertia DC motor is facilitated by the motor driver 32 and, more preferably, by a single-phase adjustable speed regenerative DC motor driver. There are a number of servo mechanism motion control motors and drives which are available to the designer to perform this function.

The means 14 to detect and measure radial force variations in the tire includes paris of load cells 34 and 36 and a loadwheel 38. The loadwheel has cylindrical surface 40 upon which the tire 12 rotates for imparting rotation to the loadwheel. The loadwheel is adapted for free rotation about a non-rotating axle spaced from, but parallel with, the axis of rotation of the tire. The axle upon which the loadwheel 38 rotates is adjustably mounted so that it may be positioned closer to, or farther from, the axis of rotation of the tire. In this manner, a predetermined deflecting load may be set up against the tire 12 by the surface 40 of the loadwheel 38.

Operatively coupled to the loadwheel 38 are two pairs of load cells 34 and 36 contain sensors such as strain gauges for measuring the forces exerted on the loadwheel by the rotating tire in both the radial and lateral directions. The load cells 34 convert the radial force variation measurements to electrical signals such as voltage level signals which are fed via lines 42 through instrumental amplifiers 44 and series resistors 46 before being combined in a summer amplifier 48. In addition to the inputs from lines 42, the summer amplifier receives a predetermined load signal command from a load potentiometer 50 which is passed through a resistor 52. The output from the summer amplifier 48 passes through line 54 into the microprocessor 18.

Also operatively coupled to the loadwheel 38 are the second pair of load cells 36 which contain sensors such as strain gauges for measuring forces exerted on the loadwheel by the rotating tire in the lateral direction. In a manner similar to load cells 36, the load cells 34 convert the lateral force variation measurements to voltage level electrical signals which are fed by lines 56 through amplifiers 58 and series resistors 60 and are then combined in the summer amplifier 62. The summer amplifier 62 also receives a predetermined load signal command from a load potentiometer 64 which is fed through a resistor 66. The output from the summer amplifier 62 passes through line 68 into the microprocessor 18. In this manner, the microprocesor 18 receives variable inputs from both the radial load cells 34 and lateral load cells 36 in addition to the input from the angle encoder as will be described later.

During the testing phase, the microprocessor 18 receives, processes and interprets the radial and lateral force variation signal, and stores the interpreted signals in its memory. Later, during the grinding phase, the microprocessor 18 produces a control signal for controlling the grinding of the tire as a function of the stored radial and lateral force variation signals. The microprocessor will be described in greater detail hereinafter.

The output of the microprocessor 18 includes a control signal on line 70 which is sent to a nodal point 72. There the signal is divided into two control signals. The two control signals are fed into servo amplifiers 74 wherein they are each summed with signals from skim sensors 76 which measure and control the nongrinding distance between the grinding wheels 78 and the shoulders of the tire 12.

The skim sensors are simply conventional paddles which push against the tire during the sensing phase. When the tire gets larger in diameter due to excessive force variations, the tire pushes out the adjacent paddle which, inturn, generates a signal to servo amplifiers 74 to move the grinders to positions toward or away from the tire being ground. The paddles are located on the shoulders of the tire immediately in front of the grinders.

A signal from the microprocessor 18 also passes through line 82 to a grind classifier 80 and to a scrap clasifier 84. A scrap limit potentiometer 86 establishes a preselectd value for a maximum limit detection so that if the microprocessor signal exceeds the preselected value, the tire will be considered non-correctable, no grinding will occcur and the tire will be dismounted from the tire uniformity machine 10. If the tire is not non-correctable, the grind classifier 80 will compare the signal with a voltage from a grind limit potentiometer 88 to determine whether additional grinding is required. If the tire is at or below the minimum level and no additional grinding is required, the signal of line 90 is summed in the servo amplifiers 74 effecting retraction of the grinding wheels 78. If the tire is between the upper and lower limits, the signal summed in the servo amplifiers 74 is converted to a hydraulic control signal. Such hydraulic control signal is passed through lines 92 to the rubber removing means 16 which is comprised of the two grinders 96.

The two grinders 96 include frames 98 which support electric motors 100, hydraulic systems 102 and grinding wheels 78. The frames 98 are pivotably mounted on the fixed portions of the machine 10 with suitable devices such as pins to allow for each grinder 96 to pivot toward or away from the shoulder of the tire 10.

The microprocessor 18 also has an input signal from the angle encoder 104 along a line 106. The angle encoder is suitably attached to the spindle 22 for determining the angular position of the tire. The signal from the angle encoder 104 to the microprocessor 18 coordinates the location of the grinding of the tire taking into account the angle difference between the loadwheel 38 and the grinders 96. The angle encoder also adjusts for sufficient lead in time between the tire and the grinders when required.

The method of the present invention involves rotating the pneumatic tires at a nongrind speed and a grind speed wherein operations such as loading, warmup and testing can be done as quickly as possible at a nongrind speed of about 100 rpm, well above the industry standard of 60 rpm. Thereafter the rotating tire is slowed to a grind speed in less than ¼ second. The actual rpm for grind speed is determined based on the design of the tire and on desired productivity and appearance constraints for the tire.

The tire 12 is initially checked up on the rim and inflated whereafter the tire is rotated at a selected speed, preferably at about 100 rpm. The loadwheel 38 is advanced against the tire so that the tire is loaded to a predetermined load within about 2 revolutions. Thereafter the tire is rotated for additional revolutions under the predetermined load.

The tire 12 is then tested for radial and lateral force variations. The magnitude of the force variations is detected and measured, preferably within a single revolution. Thereafter the microprocessor will compare the magnitude of force variations with a predetermined magnitude. The microprocessor will then decide whether a grind is necessary. If a grind is required, the microprocessor will signal the motor driver 32 to reduce the rotational speed of the tire. A signal will also be sent to the rubber removal means 16 to remove selected amounts of rubber from selected regions of the tire in a programmed manner.

The electrical signals provided to the microprocessor 18 include data samples for each test revolution of the tire with each sample representing a separate measurement of the force variation at the different angles. A measurement of the force variation at each degree increment of the tire is thereby specifically referenced to an angle location by the angle encoder 104. The above described samples per revolution are processed and fed into the microprocessor where a Fourier analysis calculation of a cyclic function is performed. The harmonic high point of force is calculated therefrom. The composite peak to peak force is also calculated by comparison of the sequential force measurements obtained during the single test revolution.

The microprocessor 18 compares the harmonic peak to peak and the composite peak to peak values calculated from a test cycle with a predetermined acceptable grind range. If the radial harmonic peak to peak and the radial composite peak to peak are less than the acceptable range, no correction is needed. The tire is satisfactory and ready for use, and it is removed from the machine 10. If either or both the harmonic peak to peak and composite peak to peak exceed the acceptable range as determined by the scrap classifier 84 and the scrap limit potentiometer 86, the tire has force variations that cannot be corrected by grinding to bring either the radial harmonic peak to peak or the radial composite peak to peak force variations within the predetermined acceptable range. If the radial harmonic peak to peak force variation and radial composite peak to peak force variation fall within the acceptable grindable range of either or both without either exceeding the second limit, the grinding procedure is performed to reduce the radial force variations.

The microprocessor 18 also utilizes a grinder displacement angle which is the difference in degrees between the loadwheel 38 and the location of the grinders 96 and 98. In addition to the grinder displacement angle, a fixed number of milliseconds prior to the grind is set which allows for the reduction of the speed of the rotating tire while the microprocessor receives the signal along line 106 from the angle encoder 104. Also, a signal is sent from the microprocessor 18 along line 108 to the motor driver 32 which, in turn, will slow the motor 24 down to allow for the grinder to be located at the leading edge of the desired grind patch at the time the spindle speed is reduced to the desired grind speed.

A grind signal is sent from the microprocessor 18 along the line 70 to a nodal point 72 wherein the signal is divided into two signals. Each of the signals passes through a servo amplifier 74 wherein the signal is converted to a hydraulic signal which is passed through lines 92 to bring the two grinding wheels 78 into grinding engagement with the leading edge of the grind patch of the tire after the tire has slowed down to a predetermined speed. In a first mode of grinding, which may be termed "composite grinding", the grind patch consists of all parts of the tire corresponding to angles of the tire which contain force variation values greater than a constant value of a calculated limit which is a proportionate part of the difference between the measured peak value of force variation and a discrete force level which is generally termed the "suppressed limit". The tire is ground when the value of the measured tire force variation as referenced to its soft spot is greater than the suppresssed limit.

The microprocessor 18 is programmed to determine a grind patch which corresponds to the minimum angle of tire rotation during grind. One means used to attain the minimum angle of rotation is to start at the calculated radial soft spot and compare sequential force variations with the suppressed limit as measured both in a clockwise and a counterclockwise direction from the soft spot. The total angle subtended before exceeding the suppressed limit in both directions is termed the nogrind portion of the tire. The remaining angular portion of the tire correspond to the desired grind patch which is normally 180 degrees or less. Generally, the grind patch is longer as greater force removal is required. When the peak to peak force only exceeds the suppressed limit by 5 pounds, the grind patch may be as small as 20 degrees.

Upon completion of grinding the grind patch, the grinder is disengaged from the tire. The microprocessor then sends a signal to the motor driver 32 to speed up the rotating tire to the nongrind speed to about 100 rpm whereupon the tire is again tested for force variations. A determination as to any further grinding is again made. If no further grinding is required, the rotating tire is stopped and the tire is ejected from the tire uniformity machine 10.

In an alternate method of grinding, generally termed "harmonic grinding," the grind output for harmonic correction is constructed in the microprocessor and is the real time difference between the "synthesized harmonic function" and a "harmonic suppressed limit." The sythesized harmonic function is calculated from the magnitude of the harmonic peak to peak force and the phase of the harmonic force as calculated by the Fourier methods referenced above. The grind output determines a grind patch which is of equal lengths on both sides of the harmonic high point. The grind patch is normally less than or equal to 180 degrees.

Prior art tire uniformity machines traditionally utilize 60 rpm, the industry standard speed, when sensing force variations in tires. While such reference speed could, theoretically, be increased by various mechanical or electrical techniques, the present tire uniformity machine employs analog electrical signals at frequencies higher than the industry standard of 60 cycles per minute as the detected signals from the load cells. Such detected signals are sent to improved summer amplifiers 48 and 62 in order to create a filtered, high frequency signal for being fed to the microprocessor. This has proven to be the preferred technique for increasing the rotational speed of the tire during testing and thereby speeding up the entire uniformity correction process. Except for the details of the increased speed, the summer amplifiers and the electrical components to effect such increased speed, the above described is essentially the same as that described in U.S. application Ser. No. 796,676 entitled Tire Uniformity Correction, filed Nov. 8, 1985, as assigned to the same assignee as the instant invention, of which this application is an improvement.

The two summer amplifiers 48 and 62 are preferably of identical construction. As a result, only one of such summer amplifiers will be described. Each of the summer amplifiers includes a pair of series amplifiers 112 and 114. The first series amplifier 112 is an operation amplifier which receives its signal at its inverting input. Series resistors 116 and 118, having values of 50,000 and 19,100 ohms, respectively, are located in series with the inverting input of the first series amplifier. Coupled with the output of the first series amplifier, and feeding back to its negative gate, is a capacitor 120 having a value of 0.1 microfarads. Also coupled with the output of the first series amplifier is resistor 122. This resistor has a value of 50,000 ohms and feeds back to a node between the series resistors 116 and 118. The non-inverting input of series amplifier 112 is grounded through resistor 124 having a value of 43,000 ohms. The input to the inverting input has further connections between the series resistors 116 and 118 which is grounded through a capacitor 126 having a value of 0.1 microfarads. The output of the first series amplifier 112 is fed through a series resistor 128 of 107,000 ohms to the second series amplifier 114.

The second series amplifier 114 is a buffer amplifier. Its input from the first series amplifier 112 is to its non-inverting input. The output from the second series amplifier is fed back to its inverting input through a resistor 132 having a value of 110,000 ohms. The non-inverting input of the second series amplifier is grounded through capacitor 134 having a value of 0.1 microfarads.

The first two series amplifiers, along with their associated resistors and capacitors as described above, constitute a three corner filter network 138, the equivalent of a third order Butterworth filter. Resistor 116 and capacitor 126 constitute one corner filter. Resistor 118 and capacitor 120 constitute a second corner filter; and resistor 128 and capacitor 134 constitute a third corner filter.

These two series amplifiers with their associated resistors and capacitors constitute networks for filtering and correcting the higher frequency electrical signals received from the load cells. Prior to the output of the series amplifiers being fed to the microprocessor, the output of the second series amplifier is fed to zero suppression network circuitry 140 wherein a DC component of about 2.00 volts is removed so that variations in the detected and processed signals will vary about a zero volt reference potential. Lastly within the summer amplifier, is gain adjustment circuitry 142 including a buffer amplifier. Consequently, the outputs of the summer amplifiers 48 and 62, as shown schematically in FIG. 1, are really the output of the buffer amplifier having been fed through the two series amplifiers of the filter network circuitry and the zero suppression network.

As the frequency to a capacitor increases, the capacitor's reactance decreases proportionately. Because of this relationship, the values of capacitors 120, 126 and 134 of the summer amplifiers, in the preferred embodiment of the present invention, are decreased to 0.6 times the values they would have been if the present machine were to be operated at the conventional industry standard frequency of 60 cpm and the conventional industry standard rotational speed of 60 rpm. In other words, by converting a prior art, conventional slower tire uniformity machine with its 60 cpm frequency and its 60 rpm tire rotational speed to the faster machine with its 100 cpm frequency and its 100 rpm tire rotational speed, 1.67 times its original speed, the capacitor values in the summer amplifiers are decreased to the reciprocal of 1.67 or 0.6. It should be appreciated, however, that the values of the various electrical components as disclosed herein are for describing the preferred embodiment of the invention and are provided for illustrative purposes only. As can be understood, the present invention could be readily practiced within a wide range of operating parameters. It could also be practiced by a wide range of means including digital filtering methods as attainable with suitable algorithms and encoding in a microprocessor or micro-computer.

The electrical input to filtering summer amplifiers in prior art tire uniformity machines running at the industry standard speed of revolution, 60 rpm, are signals generated with industry standard fundamental frequencies, 60 cpm. Such prior art signals are not modified in frequency content as are the signals generated when such machines run at higher speeds of rotation as disclosed herein. Such signal modification in signal content is directly proportional to the increased speed of revolution. When the input signals to the summer amplifiers are filtered, whether in the prior art devices or in accordance with the present invention, the filtering is effected in accordance with the filter characteristics of the summer amplifier. In the present invention, the summer amplifier modifies by either modification or attenuation each individual harmonic of the received frequency modified signal from the first harmonic up to and including the sixteenth harmonic. All subsequent, higher harmonics are filtered out as being unnecessary for a proper interpretation of force variations for the subsequent corrective grinding. In the present filtering network, however, the summer amplifier must have its component elements selected so as to attenuate proportionately each harmonic of the received signal by a factor identical with that factor which corresponds to the attenuation of each harmonic as contained in the original summer amplifier designed for 60 rpm operation of the spindle. Thus, the output to the microprocessor for interpretation, storage and subsequent grinding will be the same as if the load sensor signals had been generated and processed at the conventional industry standard speeds.

Between the output of the lateral summer amplifier 62 and the microprocessor 18, there could be provided additional circuitry to detect for conicity of the tire being tested. It is preferred, however, to feed the output of the lateral summer amplifier 62 directly to the microprocessor wherein programmed software is employed to interrogate the output of the lateral summer amplifier for determinations of conicity. Two signals are connected to the microprocessor. One is the lateral composite and the second is the radial composite signal. These signals are composite signals which vary as a function of the force variations in the tire and are cyclic, once per tire revolution. The fundamental component of each signal is the radial first harmonic signal and the lateral first harmonic signal. These are determined in the microprocessor from the composite signals. This is accomplished by a special software digital process within the microprocessor through a Fourier analyses. The microprocessor also takes the lateral composite signal and integrates its value when measured during tire rotation in the clockwise direction to determine its DC component. The tire is then rotated in the opposite or counterclockwise direction. The microprocessor then determine the DC component of the lateral component in the opposite direction. These two DC components and subtracted, one from the other, to determine the difference which is divided by two. This value is the factor representing the conicity of the tire. It should be understood that the conicity determination may or may not be utilized in association with the tire uniformity machine of the present invention and has no bearing on the overall, efficient, high speed operation of the machines as described herein.

The present disclosure includes that information contained in the appended claims as well as that in the foregoing description. Although the invention has been described in its preferred form or embodiment with a certain degree of particularity, it is understood that the present disclosure of the preferred form has been made only by way of example and that numerous changes in the details of construction, fabrication and use, including the combination and arrangement of parts and method steps, may be resorted to without departing from the spirit and scope of the invention.

What is claimed is:

1. A method of processing a tire, said method comprising the steps of:
    rotating the tire at a speed of at least 100 revolutions per minute;
    sensing force variations generated by the rotating tire;
    producing frequency modified electrical signals in response to the sensed force variations;
    processing the electrical signals in a summer amplifier so the electrical signals correlate closely to electrical signals which would be produced in response to force variations sensed at an industry standard speed for tire rotation of 60 revolutions per minute by receiving the electrical signals, by filtering such electrical signals at a frequency higher than the industry standard frequency of 60 cycles per minute and by generating a digital signal indicative of the force variations;
    processing the digital signal in a microprocessor by interpreting the digital signal and by storing the interpreted digital signal; and
    utilizing such stored signal to program the rotating of the tire and the removing of rubber from the rotating tire.

2. The method as set forth in claim 1 wherein said sensing step includes sensing both the radial and lateral force variations in the rotating tire.

3. The method as set forth in claim 2 wherein said step of processing the electrical signals is performed in two summer amplifiers in which one summer amplifier is for receiving electrical signals generated in response to radial force variations and the other summer amplifier is for receiving electrical signals generated in response to lateral force variations.

4. The method as set forth in claim 3 wherein each summer amplifier includes serially aligned amplifiers and associated resistors and capacitors arranged to constitute a filtering network.

5. The method as set forth in claim 4 further including the steps of suppressing the voltage from the filtering network about a zero voltage reference potential and then adjusting the gain through a buffer amplifier.

6. The method as set forth in claim 5 further including the step of interpreting the output of the other summer amplifier in the microprocessor to determine the conicity of the tire.

7. A method of processing a tire to correct a force variation generated during rotation of the tire, said method comprising the steps of:
   rotating the tire at a first speed greater than 60 revolutions per minute;
   sensing a force variation generated by the tire during rotation of the tire at the first speed;
   producing a frequency modified electrical signal indicative of the force variation sensed in said sensing step;
   filtering the electrical signal produced in said producing step in a summer amplifier;
   processing the filtered signal;
   generating an electrical control signal as a function of the signal processed in said processing step;
   rotating the tire at a second speed less than about 30 revolutions per minute; and
   removing rubber from the tire during rotation of the tire at the second speed in response to the control signal generated in said generating step.

8. The method set forth in claim 7 wherein said sensing step includes sensing both the radial force variation and lateral force variation during rotation of the tire.

9. The method set forth in claim 8 wherein said filtering step is performed in two summer amplifiers, one summer amplifier is for receiving the signal generated in response to the radial force variation and the other summer amplifier is for receiving the signal generated in response to the lateral force variation and wherein said processing step is performed in a microprocessor.

10. The method set forth in claim 9 further including the steps of suppressing the voltage from a filtering network in each of the summer amplifiers about a zero voltage reference potential and then adjusting the gain through a buffer amplifier.

11. The method set forth in claim 9 further including the step of interpreting the output of the other summer amplifier in the microprocessor to determine the conicity of the tire.

12. The method set forth in claim 7 wherein said step of producing frequency modified electrical signals includes correlating the signals closely with signals which would be produced during rotation of the tire at 60 revolutions per minute.

13. The method set forth in claim 7 wherein the first speed is at least 100 revolutions per minute and the second speed is less than about 15 revolutions per minute.

14. A method of processing a tire to correct a force variation generated during rotation of the tire, said method comprising the steps of:
   rotating the tire at a first speed greater than 60 revolutions per minute;
   sensing a force variation in the tire during rotation of the tire at the first speed;
   producing an electrical signal indicative of the force variation sensed in said sensing step;
   processing the electrical signal;
   generating a grind control signal when the electrical signal processed in said processing step exceeds a predetermined value;
   changing the speed of rotation of the tire to a second speed less than about 30 revolutions per minute, said step of changing the speed of rotation to the second speed being completed within one second of rotating the tire at the first speed; and
   removing rubber from the tire during rotation of the tire at the second speed in response to the grind control signal generated in said generating step.

15. The method set forth in claim 14 wherein said sensing step includes sensing both a radial force variation and a lateral force variation in the rotating tire.

16. The method set forth in claim 15 wherein said producing step is performed in two summer amplifiers, one summer amplifier is for receiving a signal generated in response to radial force variation and the other summer amplifier is for receiving a signal generated in response to lateral force variations and said processing step is performed in a microprocessor.

17. The method set forth in claim 14 wherein the first speed is at least 100 revolutions per minute and the second speed is less than about 15 revolutions per minute.

18. The method set forth in claim 14 further including the steps of:
   after said removing step, changing the speed of rotation of the tire from the second speed to the first speed within one second; and
   sensing a force variation in the tire during rotation of the tire at the first speed.

19. A method of processing a tire to correct a force variation generated during rotation of the tire, said method comprising the steps of:
   rotating the tire at a first speed greater than 60 revolutions per minute;
   sensing a force variation in the tire during rotation of the tire at the first speed;
   producing an electrical signal indicative of the force variation sensed in said sensing step;
   processing the electrical signal;
   generating a control signal as a function of the electrical signal processed in said processing step;
   changing the speed of rotation of the tire to a second speed less than about 30 revolutions per minute, said step of changing the speed of rotation to the second speed being completed within one second of rotating the tire at the first speed; and
   removing rubber from the tire during rotation of the tire at the second speed in response to the control signal generated in said generating step.

20. The method set forth in claim 19 further including the steps of:
   after said removing step, changing the speed of rotation of the tire from the second speed, to the first speed within one second; and
   sensing a force variation in the tire during rotation of the tire at the first speed.

21. The method set forth in claim 19 wherein said sensing step includes sensing both a radial force variation and a lateral force variation in the rotating tire.

22. The method set forth in claim 21 wherein said producing step is performed in two summer amplifiers, one summer amplifier is for receiving a signal generated in response to radial force variation and the other summer amplifier is for receiving a signal generated in response to lateral force variations and said processing step is performed in a microprocessor.

23. The method set forth in claim 19 wherein the first speed is at least 100 revolutions per minute and the second speed is less than about 15 revolutions per minute.

24. The method set forth in claim 19 wherein said removing rubber step includes locating rubber removal means at the leading edge of a predetermined grind patch on the tire after the speed of rotation of the tire is changed to the second speed.

25. A method of processing a tire to correct a force variation generated during rotation of the tire, said method comprising the steps of:
   rotating the tire at a first speed of at least 100 revolutions per minute;
   sensing a force variation in the tire during rotation of the tire at the first speed;
   producing an electrical signal indicative of the force variation sensed in said sensing step;
   processing the electrical signal;
   generating a control signal as a function of the electrical signal processed in said processing step;
   rotating the tire at a second speed less than about 15 revolutions per minute; and
   removing rubber from the tire during rotattion of the tire at the second speed in response to the control signal generated in said generating step.

26. A method of processing a tire to correct a force variation generated during rotation of the tire, said method comprising the steps of:
   rotating the tire at a first speed greater than 60 revolutions per minute;
   sensing a force variation in the tire during rotation of the tire at the first speed;
   producing an electrical signal indicative of the force variation sensed in said sensing step, said step of producing an electrical signal includes the step of frequency modifying the electrical signal to correlate closely with a signal which would be produced during rotation of the tire at 60 revolutions per minute by filtering the electrical signal in a summer amplifier;
   processing the electrical signal;
   generating a control signal as a function of the electrical signal processed in said processing step;
   rotating the tire at a second speed less than about 30 revolutions per minute; and
   removing rubber from the tire during rotation of the tire at the second speed in response to the control signal generated in said generating step.

* * * * *